March 18, 1930.  C. J. COBERLY  1,751,191
AUXILIARY JET CUTTING TIP FOR CUTTING TORCHES
Original Filed Sept. 29, 1923
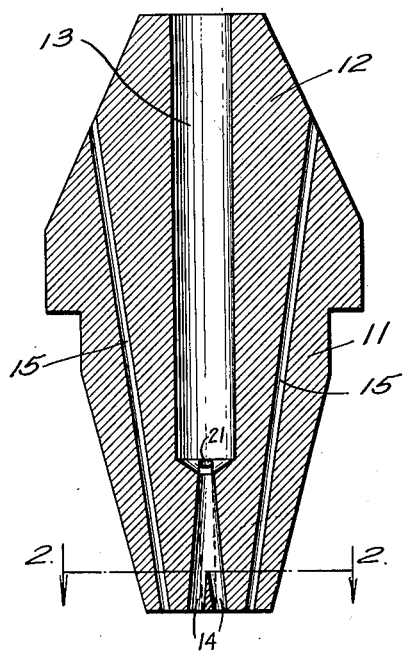
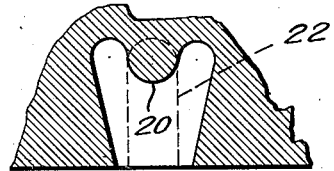
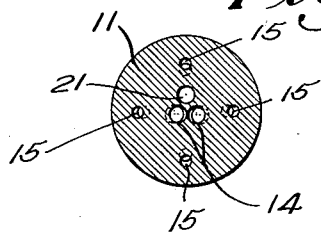
INVENTOR:
CLARENCE J. COBERLY.
By
ATTORNEY.

Patented Mar. 18, 1930

1,751,191

UNITED STATES PATENT OFFICE

CLARENCE J. COBERLY, OF LOS ANGELES, CALIFORNIA, ASSIGNOR TO KOBE, INC., OF LOS ANGELES, CALIFORNIA, A CORPORATION OF CALIFORNIA

AUXILIARY JET CUTTING TIP FOR CUTTING TORCHES

Original application filed September 29, 1923, Serial No. 665,645. Divided and this application filed September 4, 1928. Serial No. 303,720.

This application is a division of application Serial No. 665,645, filed September 29, 1923.

My invention relates to the art of cutting slots in metal plates, and is particularly applicable to the cutting of slots in oil well casing.

In the production of oil, it is generally necessary to provide a steel casing or pipe which extends from the surface of the earth down into the oil sands, and which is perforated where it extends into the oil sands with slots sufficiently narrow to hold back the coarse sand and gravel surrounding the pipe, while at the same time permitting the oil to flow therethrough. I have found that slots suitable for this purpose can be economically produced by a cutting torch, using an oxygen flame.

It is highly desirable to produce slots having a keystone-shaped section. That is to say, it is desirable to produce a slot having a uniform width at the outer surface of the pipe, which slot is wider at the inner surface of the pipe, it having been found that slots having this shape are less likely to clog up in the operation of the well. My invention provides a ready means for cutting slots of this peculiar form in the casing before it is put into the well.

Further objects and advantages will be made evident hereinafter.

Referring to the drawing which is for illustrative purposes only,

Fig. 1 is a cross-section through a form of cutting tip adapted to carry on my invention.

Fig. 2 is a section on a plane represented by the line 2—2 of Fig. 1.

Fig. 3 is a section of the slot produced.

In the form of invention illustrated in these drawings, 11 is a cutting tip having a conical head 12, which is seated in the torch in the usual manner. The tip 12 is preferably provided with a counterbored orifice 13, extending for a considerable distance into the body of the tip 11, two divergent cutting orifices 14 extending downwardly from the bottom of the counterbore portion 13. Four heating orifices 15 are provided and the torch is so arranged that oxygen is supplied to the passage 13 and to the orifices 14 and a mixture of combustible gas and oxygen is supplied to the heating orifices 15. For cutting ordinary oil well pipe having slots $\frac{3}{32}$ inch wide at the outside and $\frac{3}{16}$ inch wide at the inside of the casing, I provide heating orifices 15 which are .024 inch in diameter and I provide cutting orifices 14, .028 inch in diameter, the angle between the orifices 14 being about 7 degrees. I have found, however, that the use of only the two orifices 14 tends to cut in the form shown in Fig. 3, leaving a tongue or core 20 along the middle of the slot.

For the purpose of eliminating this core and thus speeding up the operation, I provide an orifice 21 which directs the flame centrally into the slot in the general direction of the dotted lines 22 of Fig. 3, thus tending to reduce the core 20. By the use of the auxiliary or core cutting orifice 21, I am able to economically produce wide slots in oil well casing.

Slots having a keystone shape have a special utility in oil well casing, as any material passing into the slot through the narrow outer opening will then pass entirely through the slot without clogging it.

By forming the slots with a jet of definite form, it is possible to form a slot of uniform width and form throughout its length.

By adding additional core cutting orifices, any width of slot desired may be produced.

I claim as my invention:

1. A tip for a cutting torch, comprising: a body having two opposed cutting jet orifices relatively divergent outwardly, and an intermediate cutting jet orifice positioned to direct an auxiliary cutting jet between said divergent jets.

2. A tip for a cutting torch, comprising: a body having main cutting jet orifices formed of a plurality of non-parallel openings, and an auxiliary cutting jet orifice for reinforcing any irregular cutting action of the main cutting jet.

3. A tip for a cutting torch comprising: a body having main cutting jet orifices adapted to direct oxygen against a material to be slotted, and an auxiliary jet orifice for simultaneously directing against said material a cutting jet of oxygen.

4. A tip for a cutting torch, comprising: a body having main cutting jet orifices adapted to direct oxygen against a material to be slotted, and an auxiliary jet orifice disposed between said main cutting jet orifices for simultaneously directing a cutting jet of oxygen against the material.

5. As a new article of manufacture, a cutting tip having a pair of relatively diverging cutting jet orifices, and a third cutting jet orifice cooperating therewith.

6. As a new article of manufacture, a cutting tip having a pair of cutting jet orifices for forming a pair of cutting jets positioned to form side walls of a slot, and a third cutting jet orifice for forming a third cutting jet positioned for removing material between said pair of cutting jets.

7. As a new article of manufacture, a cutting tip having a pair of relatively diverging cutting jet orifices, and a third cutting jet orifice cooperating therewith, there being means for forming a heating jet outside the area including said cutting jet orifices.

In testimony whereof, I have hereunto set my hand at Los Angeles, California, this 23rd day of August, 1928.

CLARENCE J. COBERLY.